(12) United States Patent
Chen et al.

(10) Patent No.: US 12,237,787 B2
(45) Date of Patent: Feb. 25, 2025

(54) METHOD FOR CONTROLLING DIRECT DRIVE SYSTEM AND RELATED DEVICE

(71) Applicant: AAC Microtech (Changzhou) Co., Ltd., Changzhou (CN)

(72) Inventors: Min Chen, Shenzhen (CN); Lin Qian, Shenzhen (CN); Weiling Shi, Shenzhen (CN); Xueyuan Zhu, Shenzhen (CN); Shun Guo, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/918,553

(22) PCT Filed: Jul. 28, 2022

(86) PCT No.: PCT/CN2022/108445
§ 371 (c)(1),
(2) Date: Oct. 12, 2022

(87) PCT Pub. No.: WO2024/000712
PCT Pub. Date: Jan. 4, 2024

(65) Prior Publication Data
US 2024/0213902 A1    Jun. 27, 2024

(30) Foreign Application Priority Data

Jun. 30, 2022    (CN) .......................... 202210770583.0

(51) Int. Cl.
*H02P 25/06*    (2016.01)
*H02P 23/14*    (2006.01)

(52) U.S. Cl.
CPC .............. *H02P 25/06* (2013.01); *H02P 23/14* (2013.01)

(58) Field of Classification Search
CPC ...... B60G 2202/422; B26D 2007/0043; B29C 2049/5875; H01H 2003/268; H02P 25/06; H02P 23/14
See application file for complete search history.

(56) References Cited

U.S. PATENT DOCUMENTS 6,281,644 B1 *   8/2001   Komatsu ................ H02K 16/00
                                                       310/12.32
6,590,355 B1 *   7/2003   Kikuchi ................. H02K 41/03
                                                       310/12.21

(Continued)

FOREIGN PATENT DOCUMENTS

CN           212413024 U  *  1/2021
EP           3547512 A1  * 10/2019   ......... B66B 11/0407

*Primary Examiner* — Bickey Dhakal
(74) *Attorney, Agent, or Firm* — W&G Law Group (57) ABSTRACT

A method for controlling a direct drive system, including: S1: outputting, by the actuator, a current to the winding of the stator corresponding to the actuator to cause the windings to drive the mover corresponding to the windings to move in a single direction along the guide rail; S2: sensing a position of the second position feedback means through the first position feedback means, and acquiring position information of the mover relative to the stator; and S3: changing a drive mode of the actuator according to the position information, so that the actuator adjusts, according to the drive mode, magnitude of the current outputted to the windings of the stator corresponding to the actuator. The above solution can reduce a number of power modules used in the direct drive system, so as to reduce overall manufacturing and use costs of the direct drive system.

9 Claims, 4 Drawing Sheets

(56) References Cited

U.S. PATENT DOCUMENTS

| | | | |
|---|---|---|---|
| 2004/0061385 A1* | 4/2004 | Sato | H02K 41/03 |
| | | | 310/13 |
| 2012/0091928 A1* | 4/2012 | Markon | H02K 11/225 |
| | | | 318/135 |
| 2012/0187873 A1* | 7/2012 | Nomura | H02P 25/06 |
| | | | 318/135 |
| 2017/0054400 A1* | 2/2017 | Kumazawa | H02K 41/03 |
| 2020/0161998 A1* | 5/2020 | Kim | H02K 11/215 |

* cited by examiner

METHOD FOR CONTROLLING DIRECT DRIVE SYSTEM AND RELATED DEVICE

TECHNICAL FIELD

The present disclosure relates to the technical field of direct drive transmission, and in particular, to a method for controlling a direct drive system and related devices.

BACKGROUND

With the development of motor technologies, various motors have been deployed on production lines thereof in various manufacturing industries. A direct drive transmission system using a direct drive motor is widely used in production line scenarios such as component transportation. In addition, a scheme in which the position of each transmission unit can be accurately controlled through the transmission system is gradually adopted.

A drive scheme adopted by an existing direct drive transmission system in the related art involves controlling each coil in a winding separately, and energizing the corresponding coil when a mover moves to a specific position, so as to drive a magnet on the mover to move.

However, in the direct drive transmission system in the related art, each coil is required to be driven separately under overall cooperative control of a superior system. In the presence of a plurality of windings and coils, a drive and control scheme adopted by the existing direct drive transmission system is more complex. Moreover, from the perspective of manufacturing, the direct drive transmission system in which the coils are driven separately requires a large number of power modules, which increases manufacturing and use costs.

Therefore, there is a need to provide a new method for controlling a direct drive system to solve the above problems.

SUMMARY

The technical problem to be solved in the present disclosure is to provide a solution of using a plurality of coils as a stator for control and reducing the number of power modules in the direct drive system at the same time.

In order to solve the above technical problems, in a first aspect, the present disclosure provides a method for controlling a direct drive system, the direct drive system including a guide rail, stators attached to the guide rail, movers slidable on the guide rail, actuators each corresponding to one of the stators, and a controller configured to control the actuators, each of the stators includes a stator body, windings fixed to the stator body, and a first position feedback means, and each of the movers includes a mover body, a magnet fixed to the mover body, and a second position feedback means, and the windings are arranged directly opposite to the magnet. The method includes: S1: outputting, by the actuator, a current to the winding of the stator corresponding to the actuator to cause the windings to drive the mover corresponding to the windings to move in a single direction along the guide rail; S2: sensing a position of the second position feedback means through the first position feedback means, and acquiring position information of the mover relative to the stator; and S3: changing a drive mode of the actuator according to the position information, so that the actuator adjusts, according to the drive mode, magnitude of the current outputted to the windings of the stator corresponding to the actuator.

As an improvement, the drive mode includes a main shaft mode and an auxiliary shaft mode, and the actuator adjusts, in real time according to the position information, the magnitude of the current outputted to the windings of the corresponding stator when the actuator is in the main shaft mode. The magnitude of the current outputted by the actuator to the windings of the corresponding stator is fixed when the actuator is in the auxiliary shaft mode.

As an improvement, the controller controls the actuator corresponding to the stator to be in the main shaft mode when the magnet on the mover is entirely within a drive range of the windings of the stator. The controller controls the actuator corresponding to the stator to be in the auxiliary shaft mode when the magnet on the mover is entirely outside the drive range of the windings of the stator.

As an improvement, the stators at least include a first stator and a second stator arranged adjacent to each other, and the first stator and the second stator respectively correspond to a first actuator and a second actuator, the first stator includes a first winding, and the second stator includes a second winding; the first winding and the second winding are arranged directly opposite to the magnet, and when the mover moves in the single direction along the guide rail and sequentially approaches positions directly opposite to the first stator and the second stator, the drive modes of the first actuator and the second actuator sequentially changes as follows: the first actuator is in the main shaft mode and the second actuator is in the auxiliary shaft mode when the mover moves to the position directly opposite to the first winding; the first actuator is in the main shaft mode and the second actuator is in the main shaft mode when the mover moves to a position directly opposite to a position adjacent to the first winding and the second winding; and the first actuator is in the auxiliary shaft mode and the second actuator is in the main shaft mode when the mover moves to the position directly opposite to the second winding.

As an improvement, the first actuator and the second actuator generate driving force in a same direction for the magnet of a same mover of the movers.

As an improvement, the actuators corresponding to the first stator and the second stator respectively are connected to the controller, and the controller uniformly controls switching of the drive modes for the actuators.

As an improvement, the controller calculates, according to the position information, absolute position information of the mover moving on the guide rail.

As an improvement, the first position feedback means is a reading head, and the second position feedback means is a grating scale, and the reading head is arranged directly opposite to the grating scale.

In a second aspect, an embodiment of the present disclosure further provides a computer device, including: a memory, a processor, and a computer program stored on the memory and executable by the processor, when executing the computer program, the processor is configured to implement the method for controlling a direct drive system in the above embodiments.

In a third aspect, an embodiment of the present disclosure further provides a non-transitory storage medium storing a computer program, when executed by a processor, the computer program causes the processor to implement the method for controlling a direct drive system in the above embodiments.

Compared with the related art, the method for controlling a direct drive system according to the present disclosure is used in a direct drive system in which a plurality of coils are used as a stator. Each stator is driven by a separate actuator, and all actuators are controlled by a separate controller, which can easily realize switching drive modes of different stators and prevent the problem of complex control operations caused by a plurality of control units. At the same time, with the method of integrating a plurality of coils into one stator and using one actuator to drive one stator, the number of power modules used in the direct drive system can be effectively reduced, so as to reduce overall manufacturing and use costs of the direct drive system.

BRIEF DESCRIPTION OF DRAWINGS

In order to better illustrate the technical solutions in embodiments of the present disclosure, the accompanying drawings used in the description of the embodiments will be introduced below. It is apparent that, the accompanying drawings in the following description are only some embodiments of the present disclosure, and other drawings can be obtained by those of ordinary skill in the art from the provided drawings without creative efforts.

DESCRIPTION OF EMBODIMENTS

The technical solutions in the embodiments of the present disclosure will be described below with reference to the accompanying drawings in the embodiments of the present disclosure. It is appreciated that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
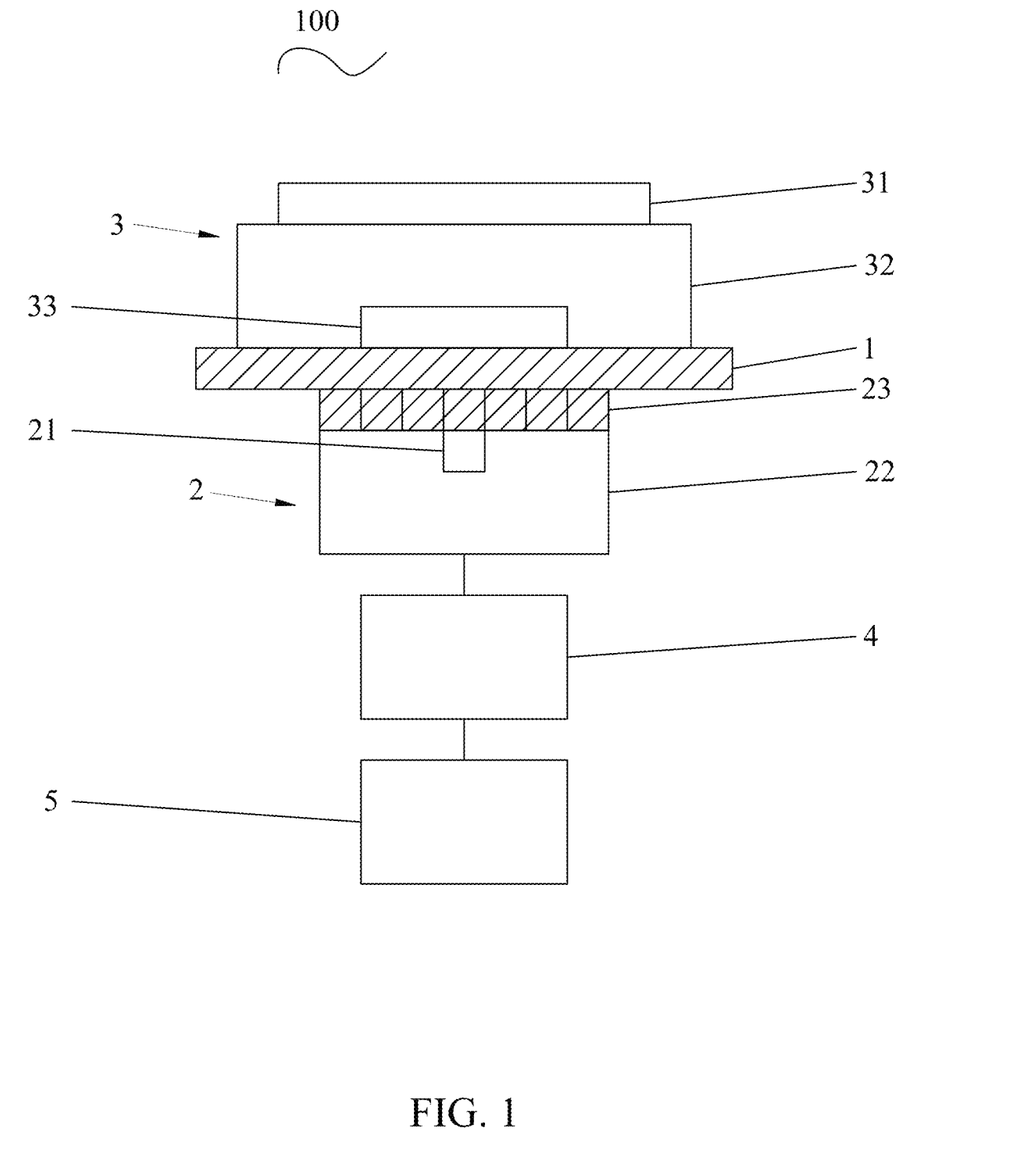
FIG. 1 is a schematic structural diagram of a direct drive system according to an embodiment of the present disclosure.

Referring to FIG. 1, FIG. 1 is a schematic structural diagram of a direct drive system 100 according to an embodiment of the present disclosure. Taking a group of stator and mover structures in the direct drive system 100 as an example, the direct drive system 100 includes a guide rail 1, a stator 2 having a first position feedback means 21 and attached to the guide rail 1, a mover 3 having a second position feedback means 31 and slidably arranged on the guide rail 1, an actuator 4 corresponding to the stator 2, and a controller 5 configured to control the actuator 4. The mover 3 includes a mover body 32 and a magnet 33 fixed to the mover body 32. The stator 2 includes a stator body 22 and a plurality of windings 23 fixed to the stator body 22. The windings 23 are arranged directly opposite to the magnet 33. The first position feedback means 21 and the second position feedback means 31 are photoelectric induction means, and the first position feedback means 21 is arranged directly opposite to the second position feedback means 31. When the first position feedback means 21 and the second position feedback means 31 are in a directly opposite configuration, the first position feedback means 21 can obtain a relative position of the second position feedback means 31.

The stator 2 includes a plurality of windings 23. As a stator structure, the plurality of windings 23 form a primary stage of the stator. The direct drive system 100 includes a plurality of groups of stators and movers having the same structure as above. Each of the stators is controlled by a corresponding one of the actuators. It is appreciated that, the system may include at least one controller.

Figure 2:
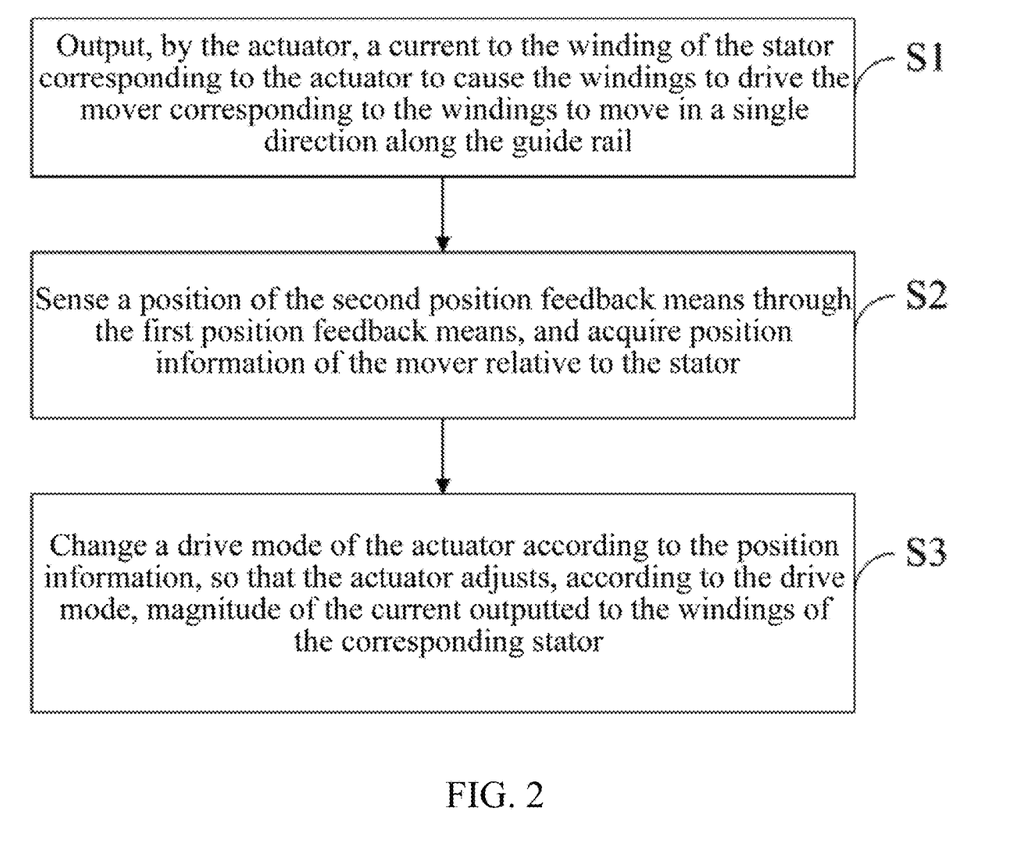
FIG. 2 is a block diagram of a method for controlling a direct drive system according to an embodiment of the present disclosure.

Referring to FIG. 2, FIG. 2 is a block diagram of a method for controlling a direct drive system according to an embodiment of the present disclosure. The method includes the following steps.

In S1, the actuator outputs a current to the windings of the corresponding stator to cause the windings to drive the mover corresponding thereto to move in a single direction along the guide rail.

Taking the direct drive system 100 as an example, when the direct drive system 100 is standby, an air-gap magnetic field is generated between the magnet 33 of the mover 3 and the windings 23 of the stator 2 adjacent thereto, the actuator 4 outputs a current to the primary stage formed by the windings 23, causing the windings 23 to generate a traveling wave magnetic field and further enabling thrust to be generated between the magnet 33 of the mover 3 and the energized windings 23, so that the mover body 32 moves along the guide rail 1 by the thrust.

In S2, a position of the second position feedback means is sensed through the first position feedback means, and position information of the mover relative to the stator is acquired.

When the first position feedback means 21 and the second position feedback means 31 are in state directly opposite to each other, that is, when the first position feedback means 21 and the second position feedback means 31 are at positions similar to those in FIG. 1, part of the second position feedback means 31 is positioned directly opposite to the first position feedback means 21. In this case, the first position feedback means 21 can obtain a relative position of the second position feedback means 31. Then, the first position feedback means 21 sends the obtained position information to the controller 5.

In S3, a drive mode of the actuator is changed according to the position information, so that the actuator adjusts, according to the drive mode, magnitude of the current outputted to the windings of the corresponding stator.

Optionally, the drive mode includes a main shaft mode and an auxiliary shaft mode, and the actuator 4 adjusts, in real time according to the position information, the magnitude of the current outputted to the windings 23 of the corresponding stator 2 when the actuator 4 is in the main shaft mode. The magnitude of the current outputted by the actuator 4 to the windings 23 of the corresponding stator 2 is fixed when the actuator 4 is in the auxiliary shaft mode.

Generally, thrust generated between the windings 23 and the magnet 33 may vary according to magnitude of the current outputted by the actuator 4 to the windings 23. In embodiments of the present disclosure, when the actuator 4 is in the main shaft mode, the actuator 4 may adjust the outputted current more finely according to the position information. For example, when the whole position of the mover 3 moves along a motion direction and gradually approaches the position of the stator 2, the outputted current should be as large as possible in order to ensure acceleration performance of the mover 3. When the mover 3 gradually moves away from the stator 2 towards the motion direction thereof, the outputted current thereof should gradually decrease in order to prevent speed fluctuations of the mover 3. Such dynamic current adjustment enables a power module such as the actuator 4 to save as much power as possible while controlling a plurality of windings.

Optionally, the controller controls the actuator corresponding to the stator to be in the main shaft mode when the magnet on the mover is entirely within a drive range of the windings of the stator. The controller controls the actuator corresponding to the stator to be in the auxiliary shaft mode when the magnet on the mover is entirely outside the drive range of the windings of the stator.

Optionally, the present disclosure provides specific embodiments to further describe the influence of changes in the drive mode of the actuator on the motion of the stator.

Figure 3:
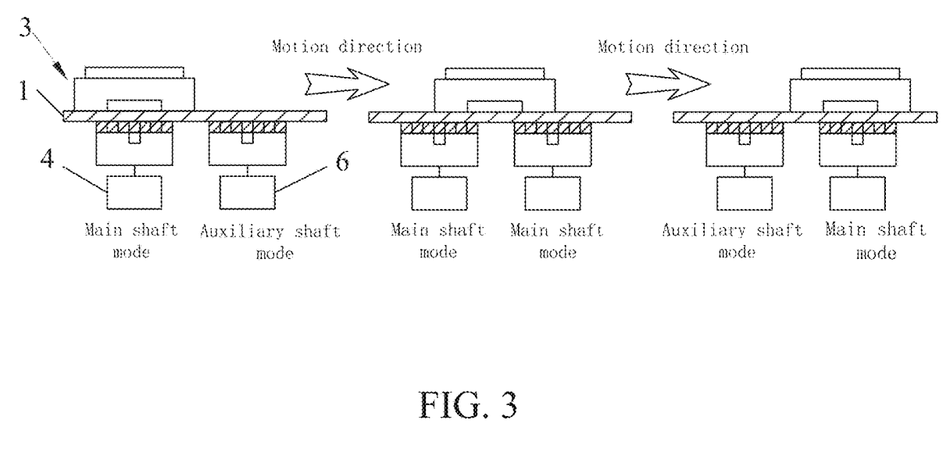
FIG. 3 is a schematic diagram of changes in a drive mode of an actuator when a mover moves across a stator in a direct drive system according to an embodiment of the present disclosure.

Referring to FIG. 3, FIG. 3 is a schematic diagram of changes in a drive mode of an actuator when a mover moves across a stator in the direct drive system. The plurality of stators at least include a first stator and a second stator arranged adjacent to each other, the actuators corresponding thereto are a first actuator 4 and a second actuator 6, respectively. The first stator has a first winding, the second stator has a second winding, the first winding and the second winding are arranged directly opposite to the magnet. When the mover 3 moves in the single direction along the guide rail 1 and sequentially approaches positions corresponding to the first stator and the second stator, the drive modes of the first actuator 4 and the second actuator 6 sequentially present successive changes as follows:

The first actuator 4 is in the main shaft mode and the second actuator 6 is in the auxiliary shaft mode when the mover moves to the position directly opposite to the first winding. The first actuator 4 is in the main shaft mode and the second actuator 6 is in the main shaft mode when the mover moves to a position directly opposite to a position adjacent to the first winding and the second winding; and the first actuator 4 is in the auxiliary shaft mode and the second actuator 6 is in the main shaft mode when the mover moves to the position directly opposite the second winding.

In embodiments of the present disclosure, if the drive mode of the actuator corresponding to the stator is the main shaft mode, it indicates that the stator currently exerts a major force on the mover. When the first actuator 4 is in the main shaft mode and the second actuator 6 is in the main shaft mode, the magnet 33 of the mover 3 is exactly positioned at a position where the first winding is adjacent to the second winding. In this case, there is a need to ensure that the actuator of at least one stator is in the main shaft mode so that the mover 3 can be applied with enough force to maintain the motion state thereof. That is, in one embodiment, when the magnet 33 of the mover 3 is exactly positioned at a position directly opposite a position adjacent to the first winding and the second winding, the drive modes corresponding to the first actuator 4 and the second actuator 6 may also be as follows:

The first actuator 4 is in the main shaft mode and the second actuator 6 is in the auxiliary shaft mode; or the first actuator 4 is in the auxiliary shaft mode and the second actuator 6 is in the main shaft mode.

How to determine the relationship between the position of the magnet 33 of the mover 3 and positions of respective windings of the first stator and the second stator is specifically obtained by sensing the second position feedback means 31 on the mover through the first position feedback means 21 on each of the stators.

Optionally, the first actuator and the second actuator generate driving force in a same direction for the magnet of a same mover.

Such arrangement is intended to prevent instability when the mover 3 moves on the guide rail 1.

Optionally, the actuators corresponding to the first stator and the second stator are connected to a same controller, and the controller uniformly controls switching of the drive modes for the actuators.

Optionally, the controller calculates, according to the position information, absolute position information of the mover moving on the guide rail.

In the direct drive system 100, in order to prevent excessively large differences between currents outputted by different actuators or to generate currents that cause the mover to act in different directions, unified control by the controller is required to prevent speed fluctuations of the same mover due to different control instructions received by the actuators during the motion. At the same time, when the controller acquires the position information, absolute position information of the mover 3 moving on the guide rail 1 can be obtained according to the position information. For example, when the position of the stator after the position information is acquired is fixed in the direct drive system 100, a relative position of the mover 3 can be obtained through the first position feedback means 21 and the second position feedback means 31 which are used as photoelectric induction means, and an absolute position of the mover 3 can be further calculated through the controller 5.

The controller 5 can adjust the drive mode of each of the actuators through the absolute position in real time, so as to control the motion of a plurality of movers in the direct drive system and reduce operational complexity of the entire direct drive system from the control aspect.

Optionally, the first position feedback means 21 is a reading head to acquire a photoelectric signal, and the second position feedback means 31 is a grating scale with an identical interval.

Compared with the related art, the method for controlling a direct drive system according to the present disclosure is used in a direct drive system in which a plurality of coils are used as a stator. Each stator is driven by a separate actuator, and all actuators are controlled by a separate controller, which can easily realize switching drive modes of different stators and prevent the problem of complex control operations caused by a plurality of control units. At the same time, with the method of integrating a plurality of coils into one stator and using one actuator to drive one stator, the number of power modules used in the direct drive system can be effectively reduced, so as to reduce overall manufacturing and use costs of the direct drive system.

Figure 4:
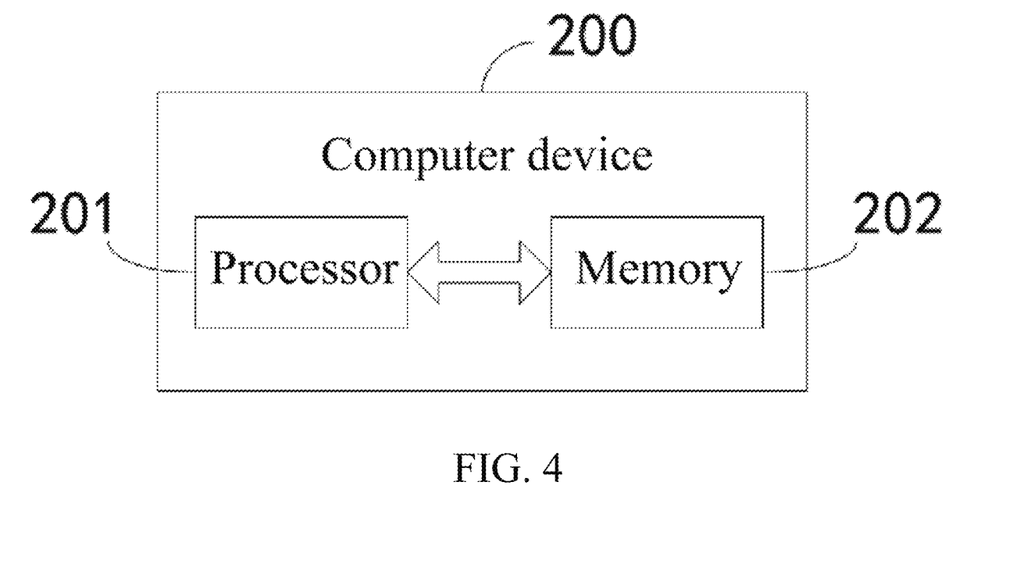
FIG. 4 is a schematic structural diagram of a computer device according to an embodiment of the present disclosure.

An embodiment of the present disclosure further provides a computer device. Referring to FIG. 4, FIG. 4 is a schematic structural diagram of a computer device according to an embodiment of the present disclosure. The computer device 200 includes: a memory 202, a processor 201, and a computer program stored on the memory 202 and executable by the processor 201.

The computer device 200 is equivalent to the controller 5 in the direct drive system 100 in the above embodiments of the present disclosure.

The processor 201 executes the computer program stored in the memory 202 to implement steps in the method for controlling a direct drive system in the above embodiments.

The computer device 200 according to embodiments of the present disclosure can implement the steps in the method for controlling a direct drive system in the above embodiments, and can achieve the same technical effect, please refer to the description in the above embodiments.

An embodiment of the present disclosure further provides a non-transitory storage medium. The non-transitory storage medium stores a computer program. The computer program, when executed by a processor, causes the processor to implementing various processes and steps in the method for controlling a direct drive system according to embodiments of the present disclosure, and can achieve the same technical effect. Details are not described herein so as to avoid repetition.

Those of ordinary skill in the art may understand that some or all procedures in the methods in the foregoing embodiments may be implemented by a computer program instructing related hardware, the program may be stored in a non-transitory storage medium, and when the program is executed, the procedures in the foregoing method embodiments may be implemented. The storage medium may be a magnetic disk, an optical disk, a Read-Only Memory (ROM), a Random Access Memory (RAM), or the like.

It is to be noted that the terms such as "comprise", "include" or other variations thereof are intended to cover a non-exclusive inclusion, for example, processes, methods, items or apparatuses including a series of elements are not limited to these elements listed explicitly, but rather include other elements not listed explicitly, or other elements inherent to these processes, methods, items or apparatuses. In the absence of further limitations, elements defined by the statement "include a/an . . . " do not preclude the existence of additional identical elements in the processes, methods, items or apparatuses including the elements.

Through the descriptions of the above embodiments, it is clear to those skilled in the art that the present disclosure may be implemented by software and a necessary universal hardware platform or by hardware, but in many cases the former is preferred. Based on such understanding, the technical solutions in the present disclosure essentially, or the part contributing to the related art may be implemented in a form of a software product. The computer software product is stored in a storage medium (e.g., an ROM/RAM, a magnetic disk, or an optical disk), and includes several instructions for instructing a terminal (which may be a mobile phone, a computer, a server, an air conditioner, a network device, or the like) to perform the methods described in the embodiments of the present disclosure.

The above are only embodiments of the present disclosure and not thus intended to limit the patent scope of the present disclosure. All equivalent structures or equivalent flow transformations made by virtue of contents of the specification and the drawings of the present disclosure or direct or indirect application of the contents to the other related technical fields shall fall within the protection scope of the present disclosure.

What is claimed is:

1. A method for controlling a direct drive system, wherein the direct drive system comprises: a guide rail, stators attached to the guide rail, movers slidable on the guide rail, actuators each corresponding to one of the stators, and a controller configured to control the actuators, wherein each of the stators comprises a stator body, windings fixed to the stator body, and a first position feedback means, and each of the movers comprises a mover body, a magnet fixed to the mover body, and a second position feedback means, and wherein the windings are arranged directly opposite to the magnet, wherein the method comprises:
   S1: outputting, by the actuator, a current to the winding of the stator corresponding to the actuator to cause the windings to drive the mover corresponding to the windings to move in a single direction along the guide rail;
   S2: sensing a position of the second position feedback means through the first position feedback means, and acquiring position information of the mover relative to the stator; and
   S3: changing a drive mode of the actuator according to the position information, so that the actuator adjusts, according to the drive mode, magnitude of the current outputted to the windings of the stator corresponding to the actuator; wherein the drive mode comprises a main shaft mode and an auxiliary shaft mode, and the actuator adjusts, in real time according to the position information, the magnitude of the current outputted to the windings of the corresponding stator when the actuator is in the main shaft mode; and
   the magnitude of the current outputted by the actuator to the windings of the corresponding stator is fixed when the actuator is in the auxiliary shaft mode;
   when the actuator is in the main shaft mode, the actuator outputs a large current to the windings of the corresponding stator when the actuator moves in the direction of its movement and is gradually close to the stator; when the actuator gradually moves away from the stator in the direction of its movement, the current output of the actuator to the windings of the corresponding stator gradually becomes smaller.

2. The method for controlling the direct drive system as described in claim 1, wherein the controller controls the actuator corresponding to the stator to be in the main shaft mode when the magnet on the mover is entirely within a drive range of the windings of the stator; and
   the controller controls the actuator corresponding to the stator to be in the auxiliary shaft mode when the magnet on the mover is entirely outside the drive range of the windings of the stator.

3. The method for controlling the direct drive system as described in claim 1, wherein the stators at least comprise a first stator and a second stator arranged adjacent to each other, and the first stator and the second stator respectively correspond to a first actuator and a second actuator, the first stator comprises a first winding, and the second stator comprises a second winding; the first winding and the second winding are arranged directly opposite to the magnet, and when the mover moves in the single direction along the guide rail and sequentially approaches positions directly opposite to the first stator and the second stator, the drive modes of the first actuator and the second actuator sequentially changes as follows:
   the first actuator is in the main shaft mode and the second actuator is in the auxiliary shaft mode when the mover moves to a position directly opposite to the first winding;
   the first actuator is in the main shaft mode and the second actuator is in the main shaft mode when the mover moves to a position directly opposite to a position adjacent to the first winding and the second winding; and
   the first actuator is in the auxiliary shaft mode and the second actuator is in the main shaft mode when the mover moves to a position directly opposite to the second winding.

4. The method for controlling the direct drive system as described in claim 3, wherein the first actuator and the second actuator generate driving force in a same direction for the magnet of a same mover of the movers.

5. The method for controlling the direct drive system as described in claim 3, wherein the actuators corresponding to the first stator and the second stator respectively are connected to the controller, and the controller uniformly controls switching of the drive modes for the actuators.

6. The method for controlling the direct drive system as described in claim 1, wherein the controller calculates, according to the position information, absolute position information of the mover moving on the guide rail.

7. The method for controlling the direct drive system as described in claim 1, wherein the first position feedback means is a reading head, and the second position feedback means is a grating scale, and the reading head is arranged directly opposite to the grating scale.

8. A computer device, comprising: a memory, a processor, and a computer program stored on the memory and executable by the processor, wherein when executing the computer program, the processor is configured to execute the computer program to implement the method for controlling the direct drive system as described in claim 1.

9. A non-transitory storage medium storing a computer program, wherein when executed by a processor, the computer program causes the processor to execute the computer program to implement the method for controlling the direct drive system as described in claim 1.

\* \* \* \* \*